(12) United States Patent
Li et al.

(10) Patent No.: US 9,940,222 B2
(45) Date of Patent: Apr. 10, 2018

(54) SYSTEM AND METHOD FOR SAFETY-CRITICAL SOFTWARE AUTOMATED REQUIREMENTS-BASED TEST CASE GENERATION

(71) Applicant: General Electric Company, Schenectady, NY (US)

(72) Inventors: Meng Li, Niskayuna, NY (US); Michael Richard Durling, Niskayuna, NY (US); Kit Yan Siu, Niskayuna, NY (US); Italo Oliveira, Rio de Janeiro (BR); Han Yu, Niskayuna, NY (US); Augusto Marasca De Conto, Rio de Janeiro (BR)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/947,633

(22) Filed: Nov. 20, 2015

(65) Prior Publication Data

US 2017/0147482 A1    May 25, 2017

(51) Int. Cl.
  *G06F 9/44*    (2006.01)
  *G06F 11/36*    (2006.01)

(52) U.S. Cl.
  CPC ............ *G06F 11/3684* (2013.01); *G06F 8/20* (2013.01); *G06F 8/35* (2013.01); *G06F 11/3608* (2013.01)

(58) Field of Classification Search
  None
  See application file for complete search history.

(56) References Cited

U.S. PATENT DOCUMENTS

| 5,652,835 | A | 7/1997 | Miller |
| 7,272,752 | B2 | 9/2007 | Farchi et al. |

(Continued)

FOREIGN PATENT DOCUMENTS

| CN | 102136047 A | 7/2011 |
| CN | 102693134 A | 9/2012 |

(Continued)

OTHER PUBLICATIONS

U.S. Appl. No. 14/565,907, filed Dec. 10, 2014, Li.

(Continued)

*Primary Examiner* — Chuck Kendall
(74) *Attorney, Agent, or Firm* — Nitin N. Joshi

(57) ABSTRACT

Automated requirements-based test case generation method includes constructing in a model-based development tool a software architecture model automatically derived from architectural information of a software design model, allocating requirement models into blocks/operators of the software architecture model, and generating component level requirements-based test cases from the software architecture. The component level requirements-based test case generation method includes receiving a software architecture along with allocated requirement models represented in hierarchical data flow diagram, selecting one of the software components, building an intermediate test model based on the selected component by automatically attaching at least one of test objectives or constraints to the corresponding software architecture model blocks/operators based on the selected test strategy, and generating human and machine readable test cases with the test generator for further automatic conversion to test executable and test review artifacts. A system and a non-transitory computer-readable medium for implementing the method are also disclosed.

9 Claims, 16 Drawing Sheets

(56) References Cited

U.S. PATENT DOCUMENTS

| | | | |
|---|---|---|---|
| 7,296,188 | B2 | 11/2007 | Paternostro et al. |
| 7,392,509 | B2 | 6/2008 | Sinha et al. |
| 7,478,365 | B2 | 1/2009 | West et al. |
| 7,584,451 | B2 | 9/2009 | Iborra et al. |
| 7,644,334 | B2 | 1/2010 | Hickman et al. |
| 7,853,906 | B2 | 12/2010 | Ganai et al. |
| 7,865,339 | B2 | 1/2011 | Rushby et al. |
| 7,970,601 | B2 | 6/2011 | Burmester et al. |
| 7,979,849 | B2 | 7/2011 | Feldstein et al. |
| 8,041,554 | B1 | 10/2011 | Limondin et al. |
| 8,307,342 | B2 | 11/2012 | Oglesby et al. |
| 8,392,873 | B2 | 3/2013 | Agrawal et al. |
| 8,612,171 | B2 | 12/2013 | Awedikian et al. |
| 8,645,924 | B2 | 2/2014 | Li et al. |
| 8,849,626 | B1 | 9/2014 | Kumar et al. |
| 2005/0043913 | A1 | 2/2005 | Hyde et al. |
| 2006/0010429 | A1 | 1/2006 | Ihara |
| 2007/0050799 | A1 | 3/2007 | Kim et al. |
| 2007/0061354 | A1 | 3/2007 | Sarkar et al. |
| 2008/0056210 | A1 | 3/2008 | Yaqub |
| 2010/0145556 | A1 | 6/2010 | Christenson et al. |
| 2010/0192128 | A1 | 7/2010 | Schloegel et al. |
| 2011/0083121 | A1 | 4/2011 | Dixit et al. |
| 2011/0231823 | A1* | 9/2011 | Fryc ............. G06F 11/3688 717/125 |
| 2013/0042222 | A1 | 2/2013 | Maddela |
| 2013/0055194 | A1* | 2/2013 | Weigert ............. G06F 8/10 717/104 |
| 2013/0073063 | A1 | 3/2013 | Kiffmeier et al. |
| 2014/0068339 | A1 | 3/2014 | Farnsworth |
| 2014/0130006 | A1 | 5/2014 | Son et al. |
| 2016/0170714 | A1 | 6/2016 | Siu et al. |

FOREIGN PATENT DOCUMENTS

| | | |
|---|---|---|
| EP | 2 131 285 A2 | 12/2009 |
| WO | 2012/049816 A | 4/2012 |

OTHER PUBLICATIONS

Porter, Joseph et al., "Towards Model-Based Integration of Tools and Techniques for Embedded Control System Design, Verification, and Implementation", Models in Software Engineering Lecture Notes in Computer Science, 2009, vol. 5421, (pp. 20-34, 15 pages total).

Karsai, Gabor et al., "Model-Integrated Development of Embedded Software", Proceedings of the IEEE, vol. 91, No. 1, Jan. 2003, (pp. 145-164, 20 total pages).

Potter, Bill "Model-Based for DO-178B", The MathWorks, Inc., 2008, 33pgs.

Berry, Gerard "SCADE: Synchronous Design and Validation of Embedded Control Software", Next Generation Design and Verification Methodologies for Distributed Embedded Control Systems, 2007, (pp. 19-33, 15 total pages).

Anand, S., et al., "An Orchestrated Survey on Automated Software Test Case Generation," Journal of Systems and Software, pp. 1-28 (Feb. 11, 2013).

"Automated Testing and Validation with Reactis," Reactive System, Inc., Retrieved from the Internet URL: http://www.reactive-systems.com/, dated Oct. 28, 2014, p. 1.

Li, M., and Kumar, R., "Model-Based Automatic Test Generation for Simulink/Stateflow using Extended Finite Automaton," 8th IEEE International Conference on Automation Science and Engineering, pp. 857-862 (Aug. 20-24, 2012).

Li, M., and Kumar, R., "Recursive Modeling of Stateflow as Input/Output-Extended Automaton," IEEE Transactions on Automation Science and Engineering, vol. 11, No. 4, pp. 1229-1239 (Oct. 2014).

Li, M., and Kumar, R., "Stateflow to Extended Finite Automata Translation," 35th IEEE Annual Computer Software and Applications Conference Workshops, pp. 1-6 (2011).

Li, M., and Kumar, R., "Reduction of Automated Test Generation for Simulink/Stateflow to Reachability and its Novel Resolution," IEEE International Conference on Automation Science and Engineering (CASE), pp. 1089-1094 (2013).

Nahar, N., and Sakib, K., "SSTF: A Novel Automated Test Generation Framework using Software Semantics and Syntax," 17th International Conference on Computer and Information Technology (ICCIT), pp. 69-74 (2014).

"NuSMV: a new symbolic model checker," Retrieved from the Internet URL: http://nusmv.fbk.eu/ pp. 1-5 (Nov. 15, 2014).

Oh, J., et al., "A Model Independent S/W Framework for Search-Based Software Testing," The Scientific World Journal, vol. 2014, Article ID. 126348, pp. 83-90 (2014).

Pasareanu, C.S., et al., "Model Based Analysis and Test Generation for Flight Software," Third IEEE International Conference on Space Mission Challenges for Information Technology, pp. 83-90 (2009).

"Simulink Design Verifier," MathWorks India, Retrieved from the Internet URL: http://www.mathworks.com/products/sldesignverifier/, pp. 1-3 (Oct. 30, 2014).

Zhou, C., and Kumar, R., "Semantic Translation of Simulink Diagrams to Input/Output Extended Finite Automata," Discrete Event Dyn Syst , vol. 22, pp. 223-247 (2012).

Extended European Search Report and Opinion issued in connection with related EP Application No. 15196758.5 dated May 10, 2016.

Non-Final Rejection towards U.S. Appl. No. 14/565,907 dated May 20, 2016.

Final Rejection towards U.S. Appl. No. 14/565,907 dated Jan. 26, 2017.

Combined Search and Examination Report issued in connection with corresponding GB Application No. 1619371.6 dated Apr. 20, 2017.

* cited by examiner

```
###############################################################
# req19: function1 shall limit var18 to 30 when var16 is value1
###############################################################
Time step1
inputs
# enum4
SSM::set integration/var1 value3
# boolean
SSM::set integration/var2 value2
# enum5
SSM::set integration/var3 value4
# real
SSM::set integration/var4 18.0
# real
SSM::set integration/var5 26.0
# real
SSM::set integration/var6 30.0
# real
SSM::set integration/var7 10.0
# enum6
SSM::set integration/var8 value1
# enum7
SSM::set integration/var9 value2
# real
SSM::set integration/var10 0.0
# enum3
SSM::set integration/var11 value1
# enum8
SSM::set integration/var12 value3
# real
SSM::set integration/var13 1.0
# real
SSM::set integration/var14 33.0
# real
SSM::set integration/var15 20.0 outputs
real
SSM::check integration/var17 3.0
# real
SSM::check integration/var18 30.0
# real
SSM::check integration/var19 50.0

#SSM::cycle
```

SYSTEM AND METHOD FOR SAFETY-CRITICAL SOFTWARE AUTOMATED REQUIREMENTS-BASED TEST CASE GENERATION

BACKGROUND

Safety-critical software, such as aviation software, is required by certification standards (e.g., DO-178B/C for aviation software) to be strictly verified against certification objectives. Testing is an essential part of the verification process. Manual test case generation from the requirements is hard and time-consuming, especially with complex, large software.

Automatically generated test cases and/or test procedures derived from the high-level software requirements can help reduce the cost introduced by manual test case generation and review activities. Those test cases and/or test procedures generated from the specifications can be executed on the associated low-level design implementations through a test conductor.

Conventional test tools and/or models are not able to generate requirements-based test cases at different levels in the design model. The generated test cases produced by conventional tools cannot be directly executed on components at multi-levels in the design.

BRIEF DESCRIPTION OF THE DRAWINGS

FIG. 12 depicts an exemplary integration level test script in accordance with embodiments.

DESCRIPTION

In accordance with embodiments, systems and methods automatically create a software architecture model from the software design architecture along with requirement models to automate multi-level architectural requirements-based test case generation based on the proposed software architecture model.

In accordance with embodiments, the software architecture model and its requirements allocation are constructed using a model-based development (MBD) tool with the representation of a hierarchical data flow diagram. As opposed to conventional MBD tools, which are traditionally used for low-level design, an embodying MBD tool automatically creates the software architecture model from the software design architecture and generates corresponding test cases for the system-level or high-level requirements.

Embodying systems and methods can implement component-level requirements-based test case generation to automatically generate test cases for components at different levels in the software architecture.

Figure 1:
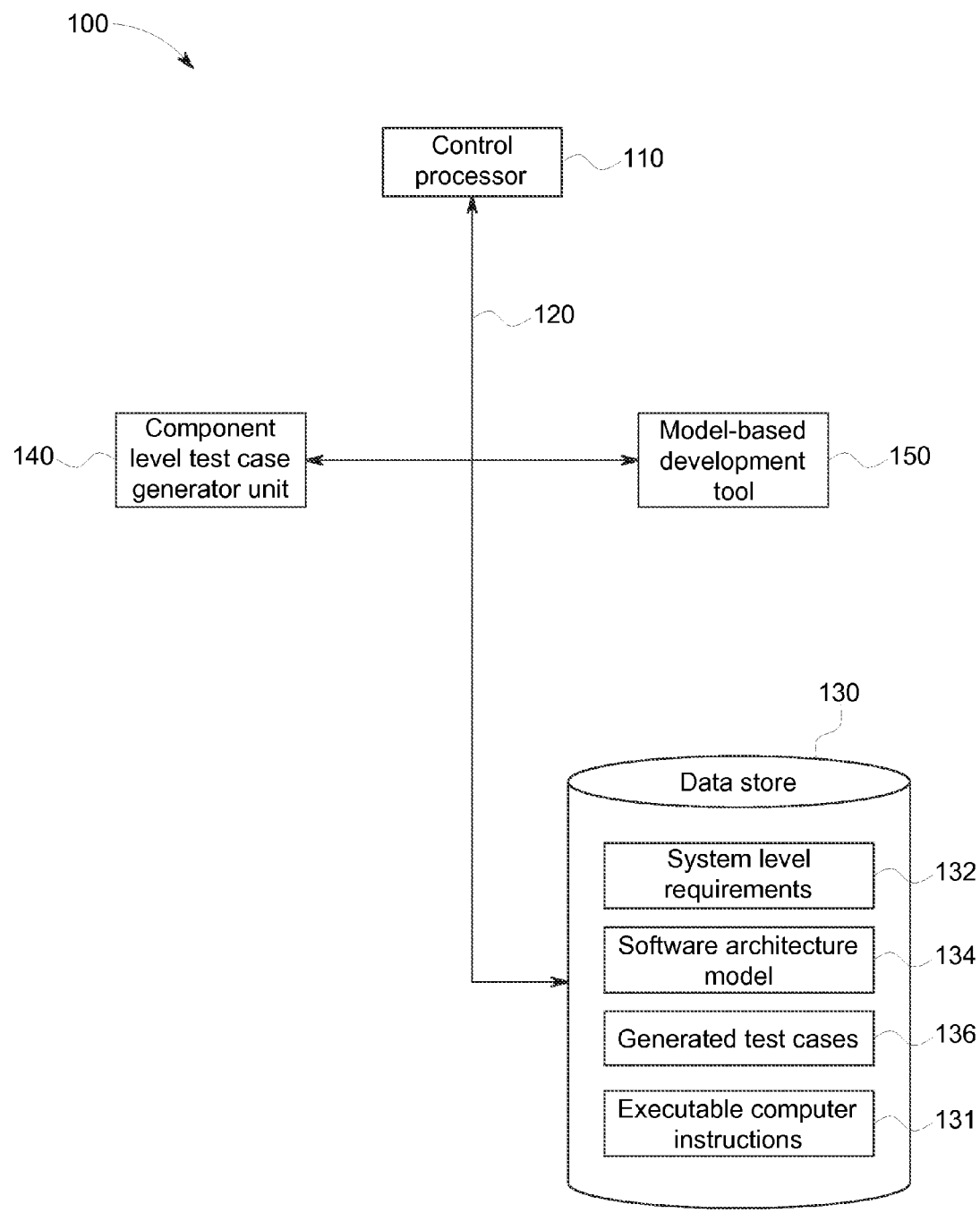
FIG. 1 depicts a system for automated requirements-based test case generation in accordance with embodiments.

FIG. 1 depicts system 100 for automated requirements-based test case generation in accordance with embodiments. System 100 includes control processor 110 which executes computer instructions 131 to control the operation of the system and its components. The executable instructions can be stored in data store 130, which also can store data accessed and generated by the system. Control processor 110 can be located in a computer, or a server, and interconnected to the various components via communication link 120. The communication link can be an internal bus, an electronic communication network, or the like. System 100 can generate test cases from system and/or high level requirements 132 of the safety-critical software.

Figure 2:
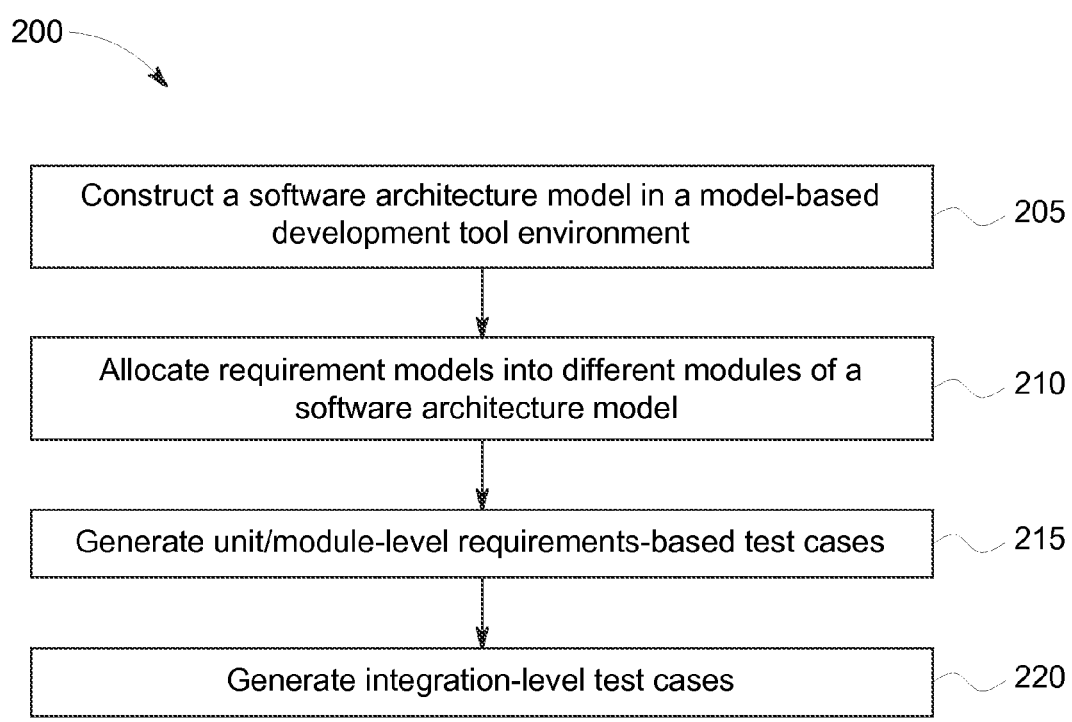
FIG. 2 depicts a process for software testing in accordance with embodiments.
Figure 3A:
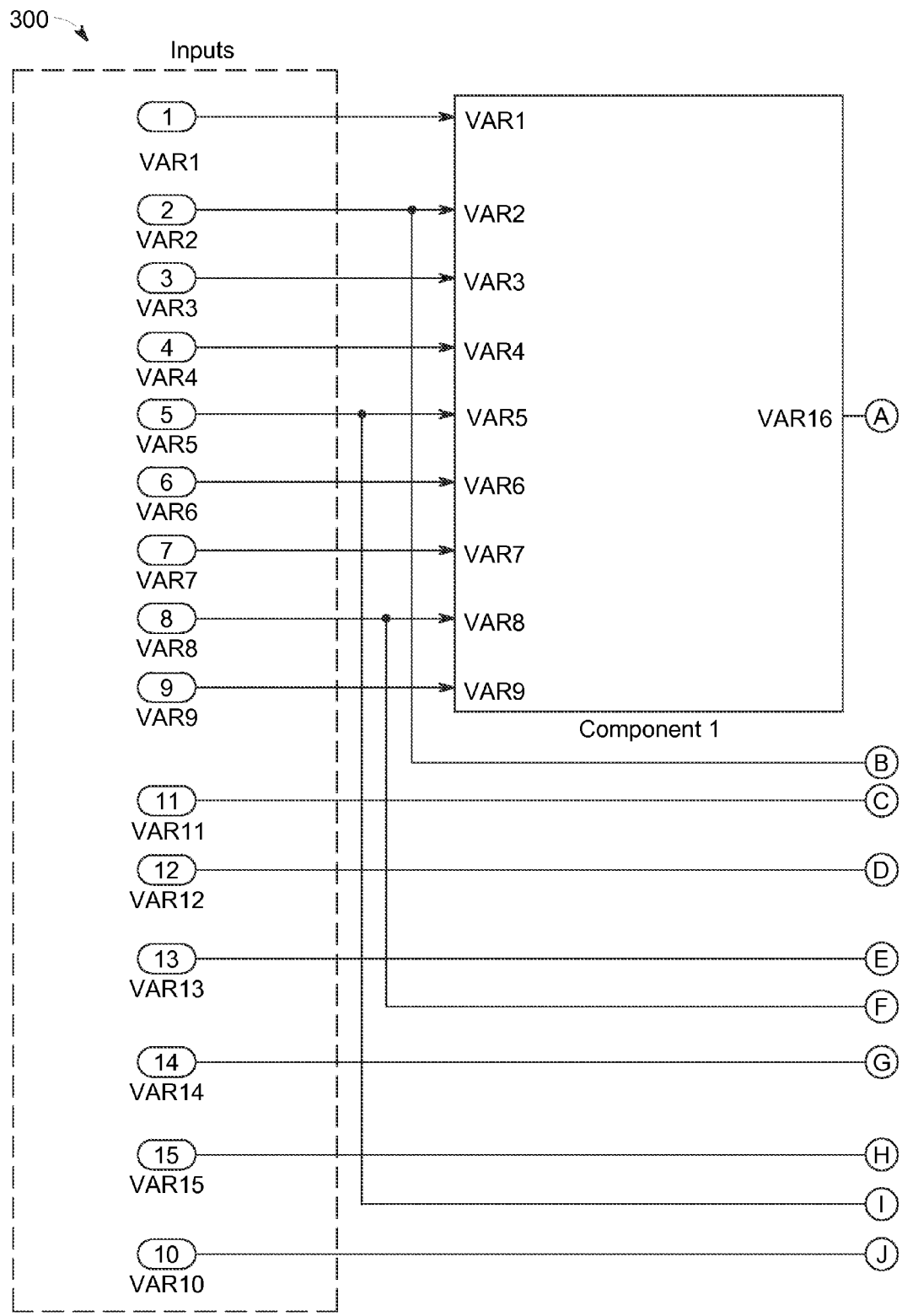
FIGS. 3A-3D depict a software architecture model automatically derived from a software design in accordance with embodiments.
Figure 3B:
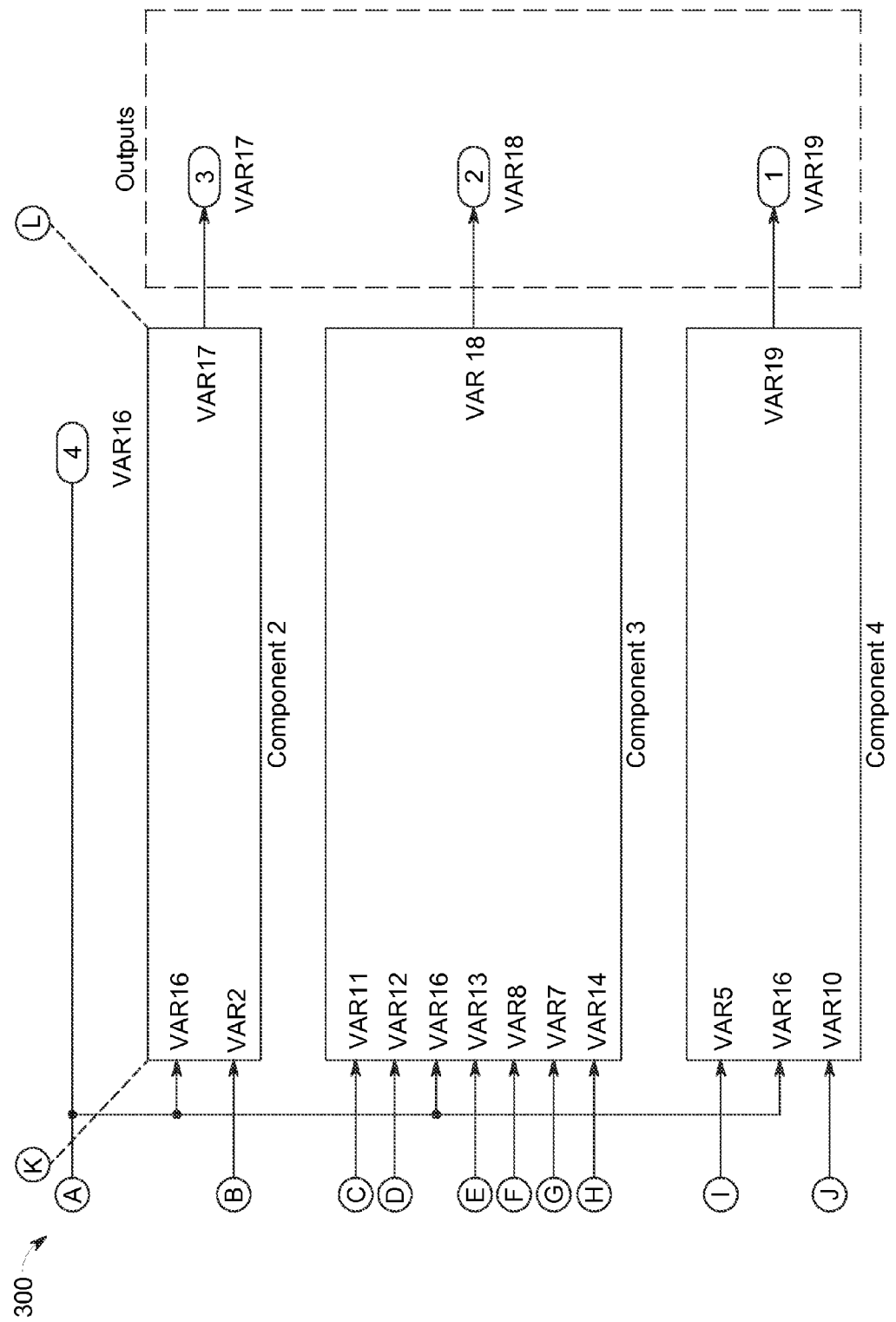
Figure 3C:
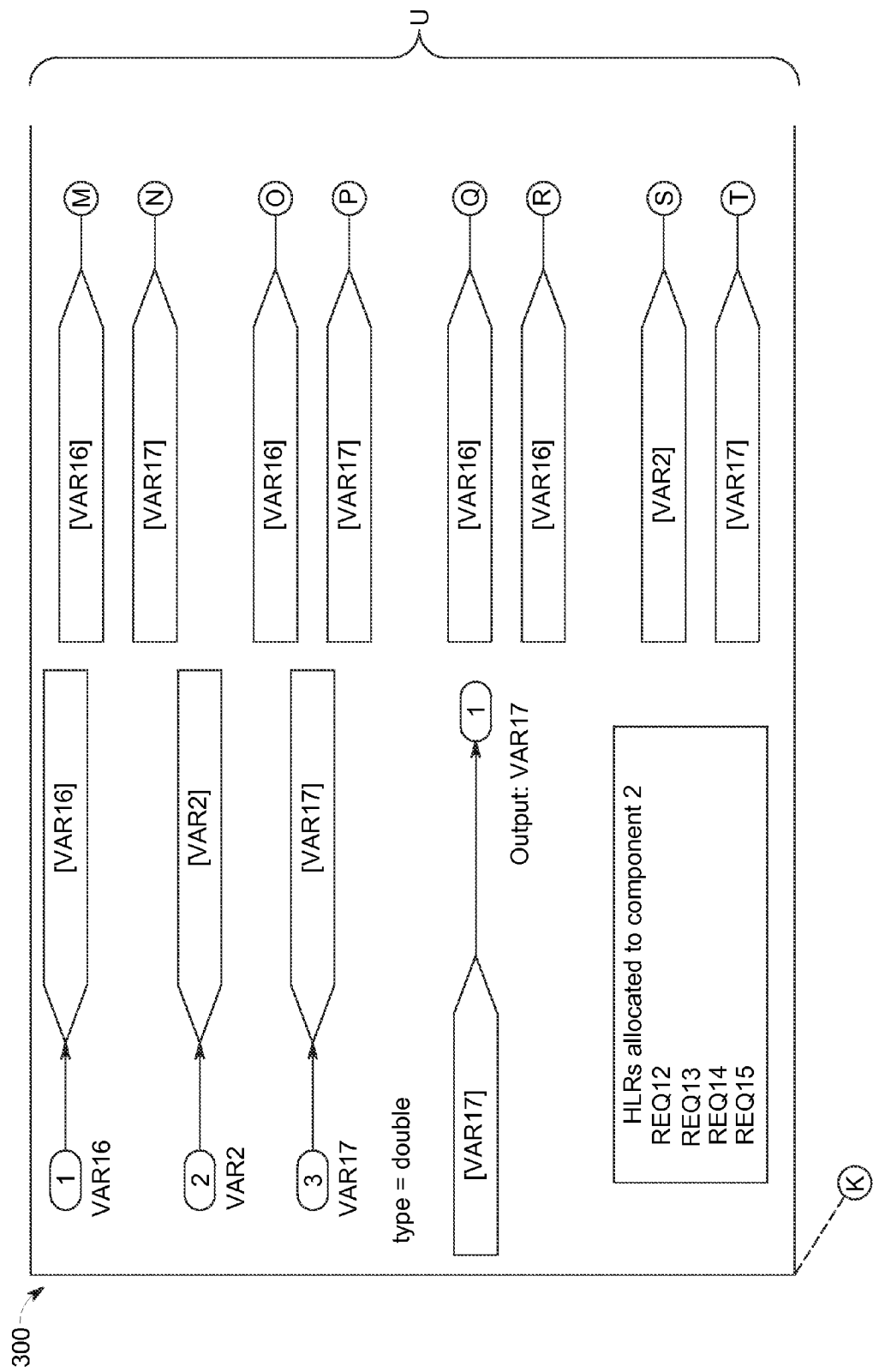
Figure 3D:
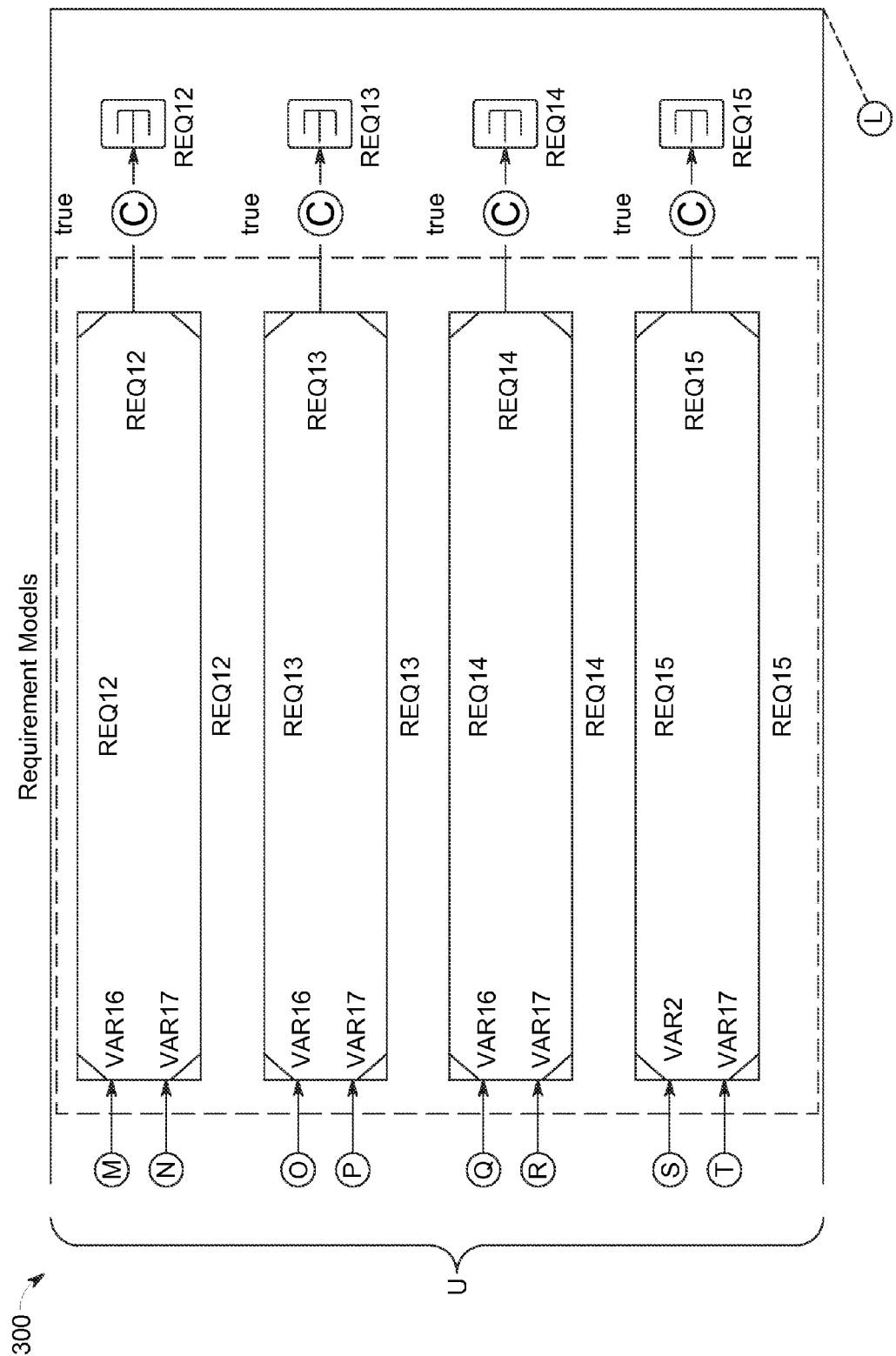

FIG. 2 depicts process 200 for automated software testing in accordance with embodiments. Process 200 derives software architecture model 134 from the software design model. The software architecture model is constructed, step 205, in model-based development tool 150 environment based on the design model's architectural information. This software architecture model can be automatically created in accordance with some implementations. Requirement models are allocated, step 210, into different modules in the software architecture model by connecting the corresponding monitored/controlled variables (e.g., FIG. 1: VAR1-VAR19) with the input/output ports of the component. In accordance with some embodiments, at step 205 input ports for all output variables in the requirement models can be added. By adding input ports for all output variables, the test case generator can generate inputs and expected outputs for the test cases in one run.

The component-level test case generator unit 140 can use the software architecture model with allocated requirements to generate, step 215, unit/module-level requirements-based test cases. The test case generator unit 140 can also generate, step 220, integration-level test cases to verify if the code component or integration complies with the allocated requirements.

FIGS. 3A-3D depict software architecture model 300 built as a hierarchical data flow diagram based on the software design architecture in accordance with embodiments. Each component Component1, Component2, Component3, Component4 in the software design is a block/operator in the software architecture model with input and output ports. Blocks/operators in the software architecture model are connected with each other and can have multiple layers of sub-blocks/sub-operators. Requirement models REQ12, REQ13, REQ14, REQ15 are allocated into the software architecture model and connected to the input and output ports. The building process is automatic, systematic and modular. The hierarchical data flow provides good visualization and easy traceability from the requirements to the software design.

Figure 4:
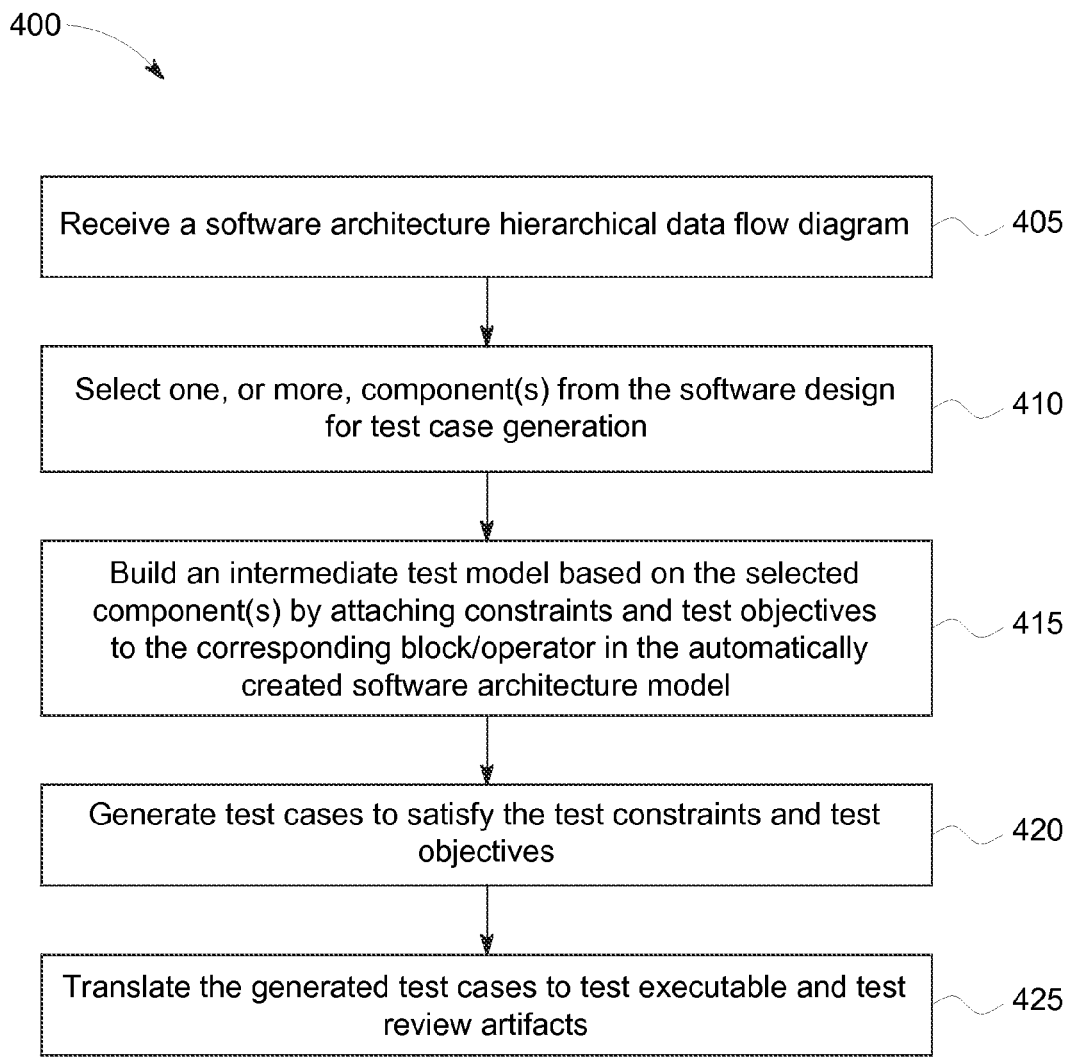
FIG. 4 depicts a process for component-level test case generation in accordance with embodiments.

FIG. 4 depicts process 400 for component-level test case generation in accordance with embodiments. Process 400 is based on a received, step 405, automatically created software architecture model in the form of a hierarchical data flow diagram with requirement models allocated. One, or more, of the software components in the software design is selected, step 410, based on the level of test generation, and the corresponding software architecture model block/operator is used for test case generation. An intermediate test model is built, step 415, based on the selected component by attaching the test constraints and test objectives to the corresponding software architecture model block/operator. The test objectives are attached to satisfy certain coverage criteria at the requirements-level, such as requirements coverage (e.g., all requirements are activated), logic condition coverage (e.g., logic conditions in the requirements are activated at certain level), etc. The test constraints are attached to the model to constrain the monitored/controlled variables range and to ensure that the generated test cases do not violate the requirements.

The automatic test case generation strategies (i.e., to attach the test objectives and the constraints) can be based on the general form of a requirement. In natural structural English language, the form of a requirement can be expressed as:

<antecedent expression>implies<consequent expression>,

Where <antecedent expression> is a logic expression on monitored variables;

and <consequent expression> is a logic expression on controlled variables.

Figure 5:
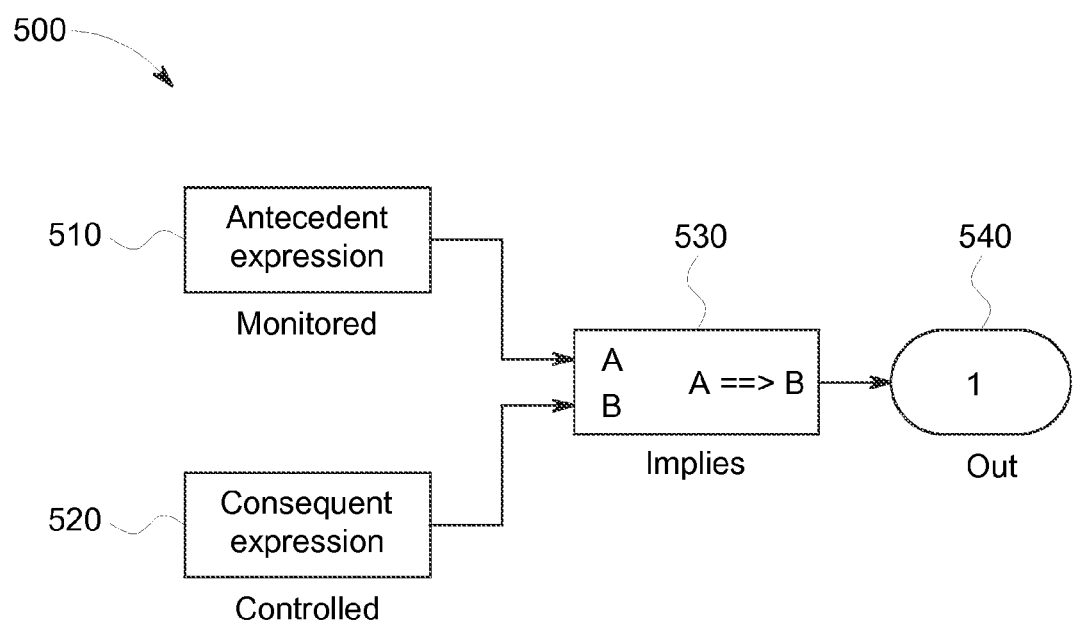
FIG. 5 depicts a requirement model in accordance with embodiments.

FIG. 5 depicts requirement model 500 (when expressed in Simulink) in accordance with embodiments. The requirement model includes antecedent expression 510 and consequent expression 520. These expressions are provided to logic block 530, which implies output signal 540 based on the expressions' states (i.e., A==>B). In order for the requirement to hold, the output signal must be 1 or "true". The automatic test case generator unit 140 receives such and, from that, generates test cases, according to one or more strategies (e.g., requirements coverage strategy, logic condition coverage strategy, input masking strategy, etc.). Embodiments are not so limited, and other strategies for test case generation are within the contemplation of this disclosure.

A requirements coverage strategy includes, for each requirement, generating one test case where the requirement must be satisfied with the antecedent expression being true. This is done by inserting test objectives and constraints and running a test generation engine that can drive the input sequences to achieve the test objectives.

Figure 6:
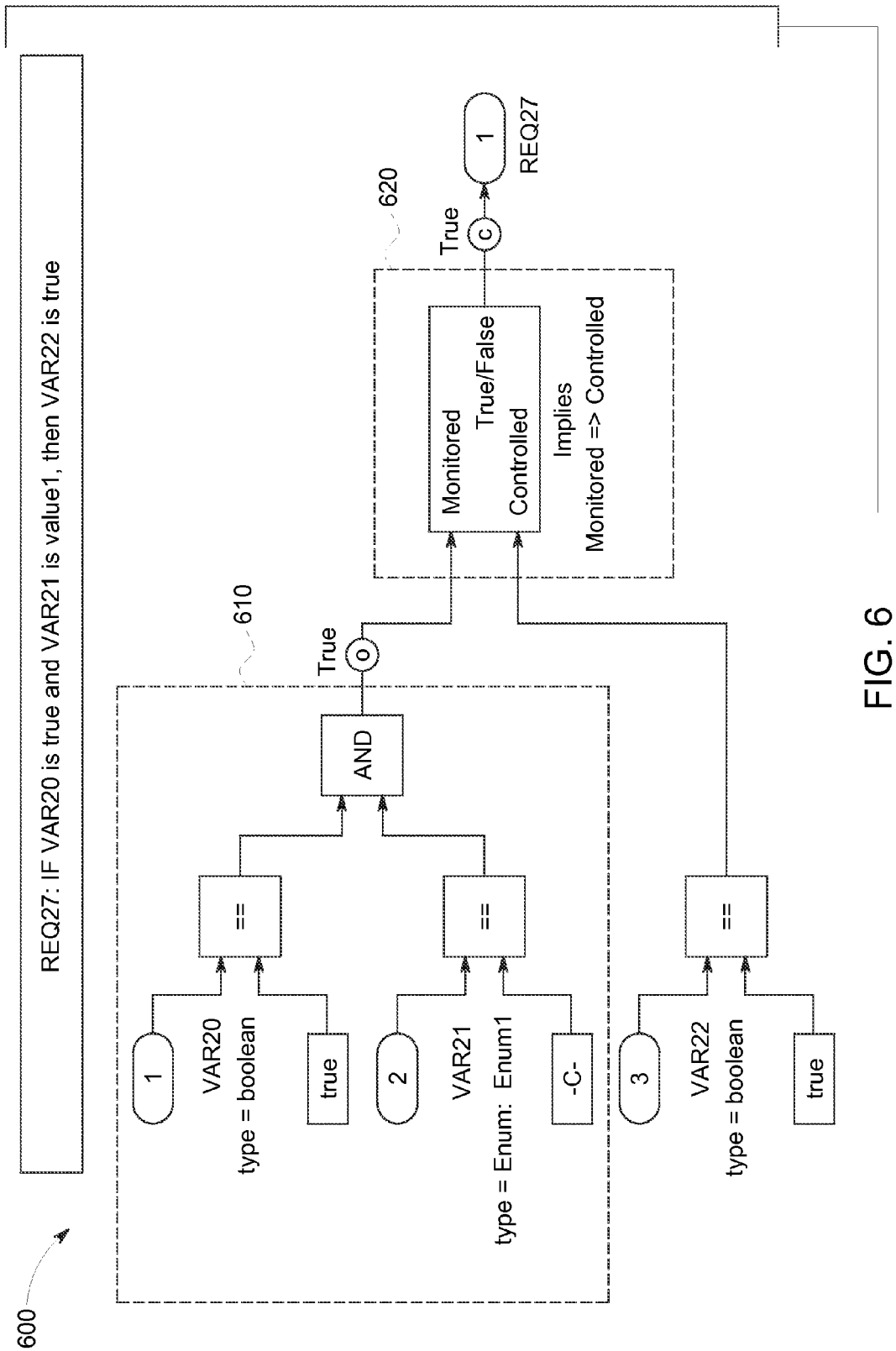
FIG. 6 depicts a requirement model with attached test objectives in accordance with embodiments.

By way of example, the insertion of a test objective can be done using test objective and test condition blocks from a commercial design verifier block library in the selected model-based development tool (e.g., such as Simulink Design Verifier blocks available from Simulink). The test generation engine can be used to drive the inputs to achieve the test objectives. FIG. 6 depicts requirement model 600 with attached test objectives in accordance with embodiments. Test Objective block 610 (notated with a "O" within a circle), is analyzed by the design verifier to find a combination of variable value assignments VAR21, VAR22 that cause its antecedent expression, which is of Boolean type, be true. Test Condition block 620 (notated with a "C" within a circle), causes the design verifier to keep the output of the "implies" block to be true. A true output signal of the "implies" block is an indication that the requirement REQ27 is satisfied. The value assignments to the monitored and controlled variables are generated automatically by the design verifier.

A logic condition coverage (LCC) strategy can be implemented to achieve functional coverage of logic equation conditions. Each condition within a logic equation is demonstrated to have an effect on the outcome of the logic equation by varying only that condition and holding fixed for all others that could affect the outcome. Consider the examples in Table 1, which depicts logic condition coverage for two variables, where two Boolean values (a and b) are the conditions for the listed Boolean operators. Table 1 indicates whether a test case is necessary to achieve LCC coverage (‡) or not (x). When the antecedent expression has one of these operators, test cases are generated for each of the corresponding combinations marked with (✓), and this is generalizable for any number of operands.

TABLE 1

| Boolean | Test Case (T = True, F = False) | | | |
|---|---|---|---|---|
| operator | TT | TF | FT | FF |
| a AND b | ✓ | ✓ | ✓ | ✗ |
| a OR b | ✗ | ✓ | ✓ | ✓ |
| a NAND b | ✓ | ✓ | ✓ | ✗ |
| a NOR b | ✗ | ✓ | ✓ | ✓ |
| a XOR b | ✓ | ✓ | ✓ | ✓ |
| a XNOR b | ✓ | ✓ | ✓ | ✓ |

Figure 7:
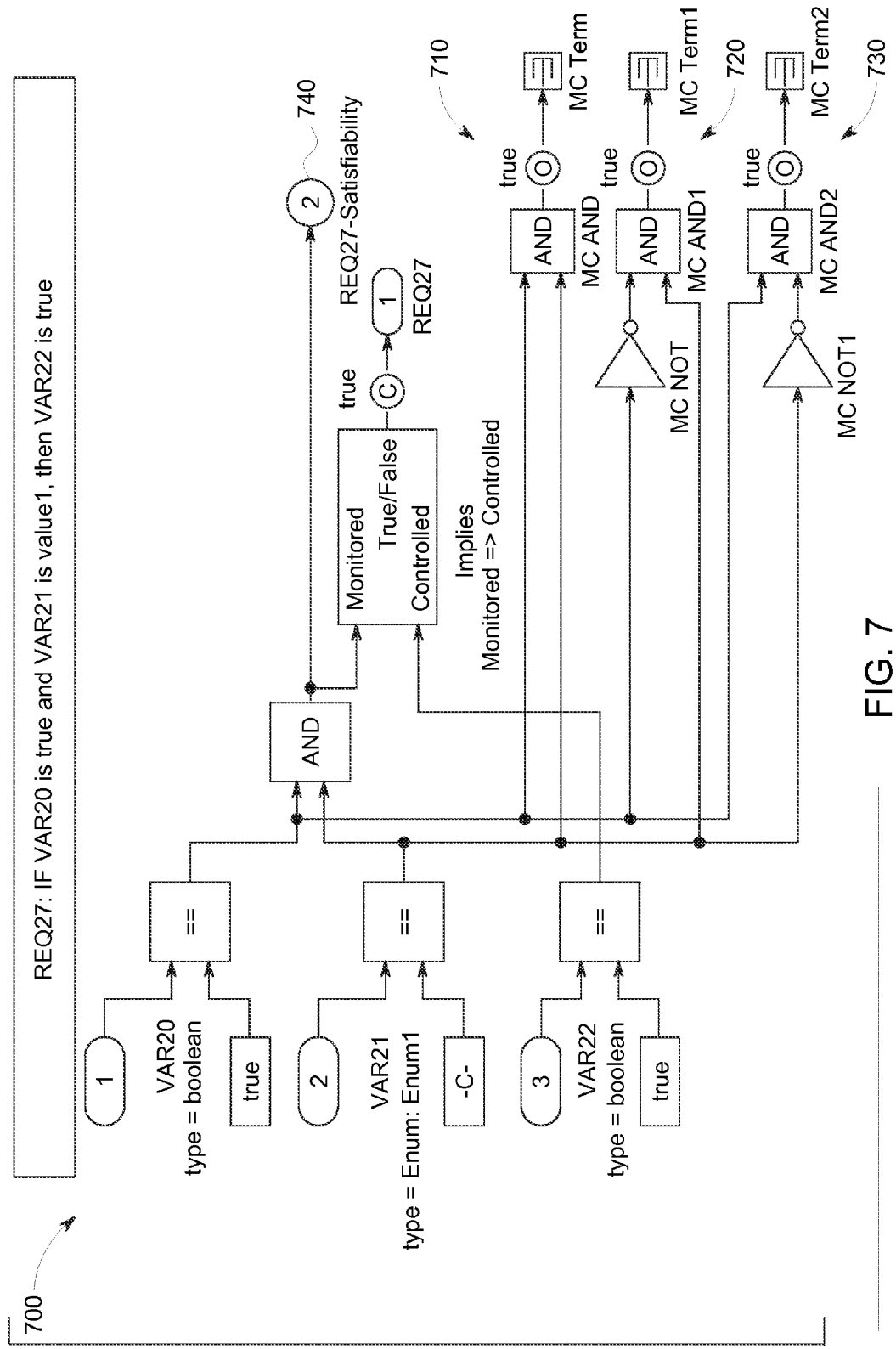
FIG. 7 depicts a logic condition coverage model with attached test objectives in accordance with embodiments.

FIG. 7 depicts logic condition coverage model 700 with attached test objectives in accordance with embodiments. This LCC model is based on requirement model 600 with a pattern of additional test objective and condition blocks 710, 720, 730. In order to generate the test cases, the test objective blocks are attached according to the Boolean operators used and respective cases in Table 1. After running the test generation engine, a set of test cases is generated to satisfy logic condition coverage. Each generated test case is also examined in order to discover which requirements it "activates"—activation means that the output signal of Satisfiability port 740 must be 1 or "true".

An input masking strategy can achieve masking Modified Condition/Decision Coverage (MC/DC). The masking MC/DC meets the definition of independent effect by guaranteeing the same minimum test cases at each logical operator as a unique cause, and is acceptable for meeting the MC/DC objective of safety-critical software development standards (e.g., DO-178B/C). Masking refers to the concept that specific inputs to a logic construct can hide the effect of other inputs to the construct. For example, a false input to an AND operator masks all other inputs, and a true input to an OR operator masks all other inputs. The masking approach to MC/DC allows more than one input to change in an independence pair, as long as the condition of interest is shown to be the only condition that affects the value of the decision outcome. However, analysis of the internal logic of the decision is needed to show that the condition of interest is the only condition causing the value of the decision's outcome to change.

Figure 8A:
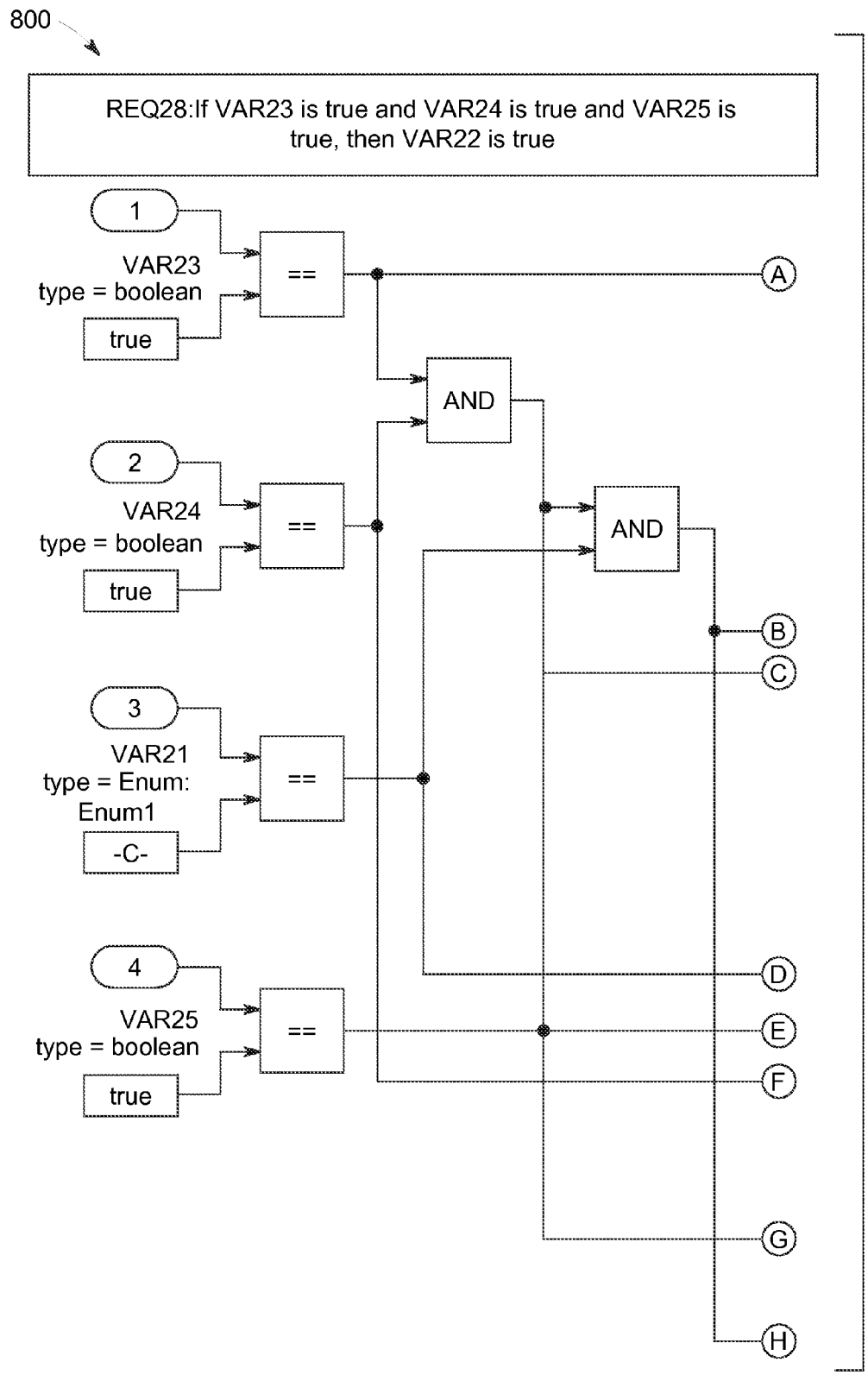
FIGS. 8A-8B depict an input masking model with attached test objectives in accordance with embodiments.
Figure 8B:
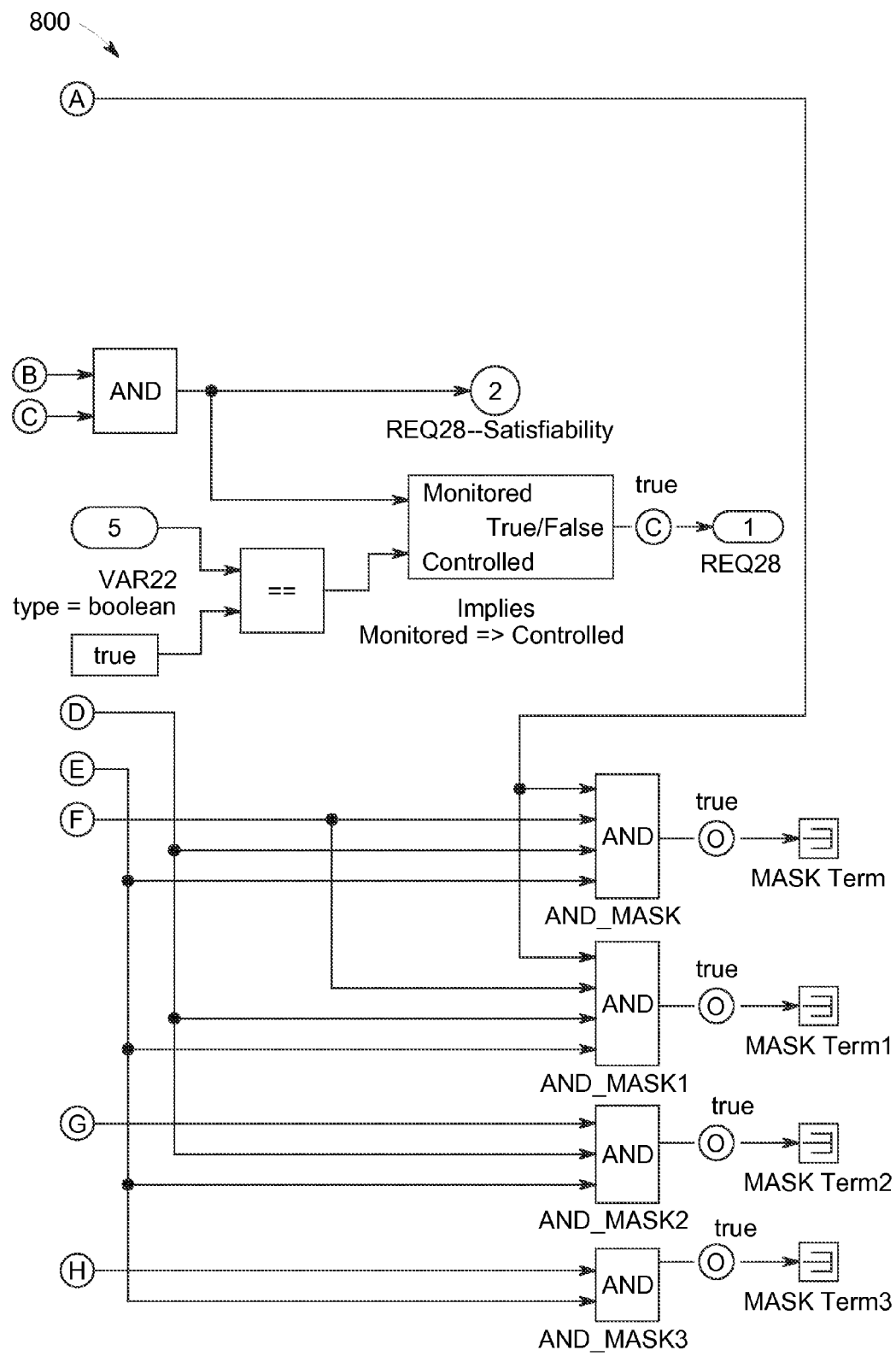

FIGS. 8A-8B depicts input masking model strategy 800 with attached test objectives in accordance with embodiments. Each sub-expression depicted in input masking model 800 corresponds to a signal/block path that starts at an input condition of the antecedent expression, involving a monitored variable VAR23, VAR24, VAR25, and ends at the signal that represents the result of the monitored expression. From this model, test cases can be automatically generated, associated to requirements REQ28 by automatic test case generator unit 140 and translated to an output test script.

The input masking test generation strategy attaches test objectives according to the following steps:

For each basic proposition (input condition) of the antecedent expression, obtain the set S of all sub-expressions which contain this proposition, except the proposition itself. Then, for each expression in set S: (1) if the top-level operation of the sub-expression is an OR gate, substitute this expression by its negation in S; (2) create an expression e which is the conjunction of all expressions in S and the basic proposition of above; and (3) create a test objective which must make expression e true;

With reference again to FIG. 4, after attachment of the test constraints and test objectives process 400 continues with test case generator unit 140 generating test cases 136, step 420. The test case generator unit can perform model-checking, constraint solving, and reachability resolution methods on the intermediate test model to generate the test cases so as to satisfy the test objectives and/or detect unreachable test objectives. The generated test cases are translated, step 425, into test scripts for test execution and test review artifacts for certification. The advantage of the component-level test generation method is that the method is flexible to automatically generate requirements-based test cases for components at different levels in the software architecture to achieve appropriate requirements-level coverage criteria. In accordance with embodiments, test cases can be generated applicable to either unit/module level testing as well as integration level testing.

Figure 9:
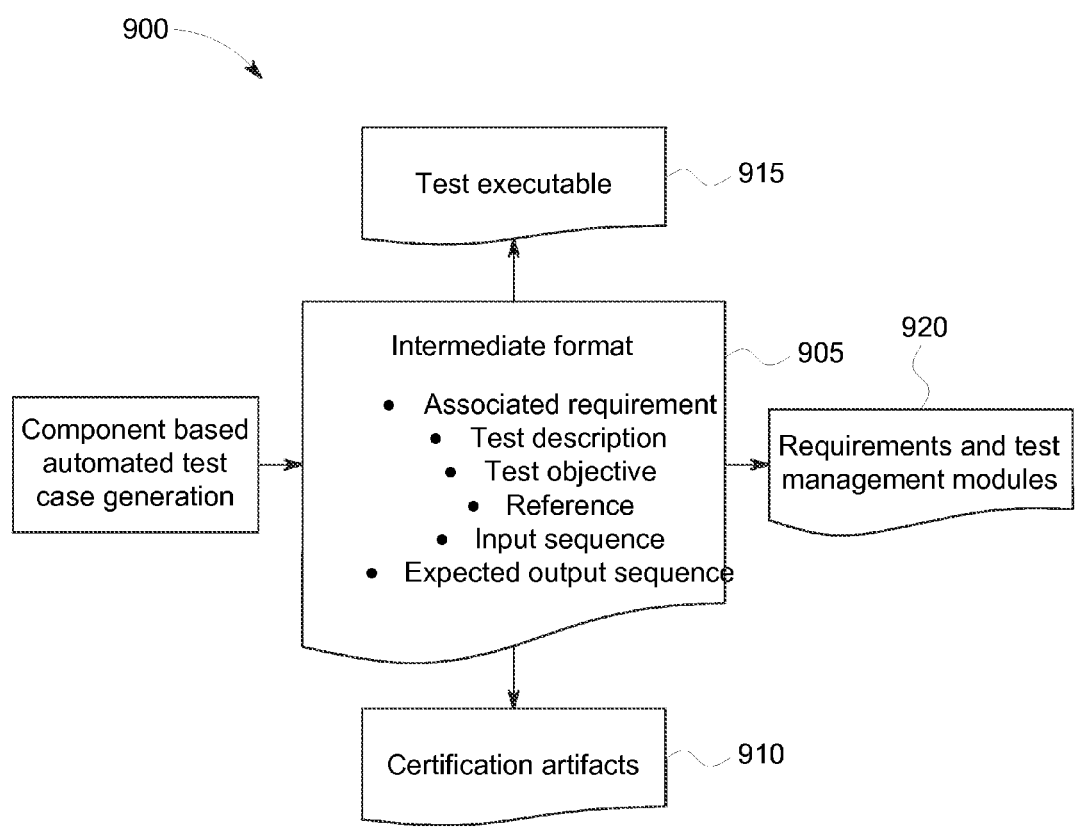
FIG. 9 depicts a test script generation and review process in accordance with embodiments.

FIG. 9 depicts process 900 for test script generation and test artifact review in accordance with embodiments. The intermediate format 905 generated by process 900 can be readable by humans and/or machines. Process 900 operates on the component-level test cases described above. An intermediate format is generated, step 905, from the test cases. This intermediate format can indicate the input and expected output information. The intermediate format can also indicate the requirements to which the test case traces back, the test objective that the test case is satisfying, and the reference that the test objective is derived from. The intermediate information can be used to manually, or automatically, conduct test reviews. Certification artifacts are generated, step 910, from the intermediate information. The intermediate information can be used to generate, step 915, executable test scripts suitable to execute in different test environments. The test scripts can also automatically be written back, step 920, to requirements and test management tools (e.g., IBM® Rational® DOORS®).

Figure 10:
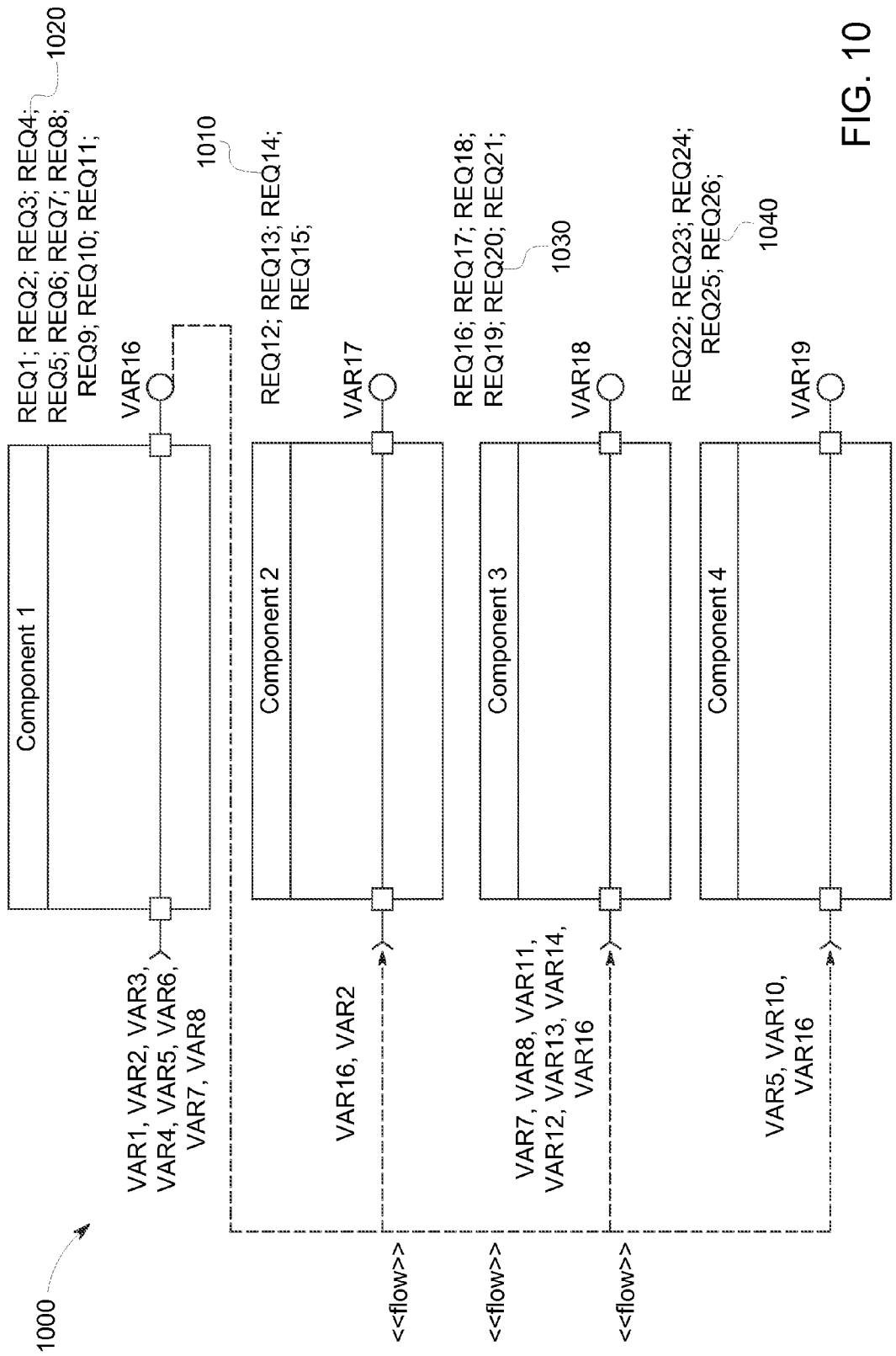
FIG. 10 depicts an exemplary software architecture design and the associated requirements traceability information in accordance with embodiments.

Collectively, FIGS. 10-13 depict an illustration of an end-to-end implementation in accordance with embodiments. FIG. 10 depicts exemplary software architecture design model 1000 and the associated requirements traceability information in accordance with embodiments. The software architecture model can be constructed (FIG. 2, step 205) as a Simulink model (FIGS. 3A-3D). Each block in the software design model software architecture design is converted to a block in the software architecture model in Simulink with the same interface and architectural information. Each block in the software architecture model is also allocated with a set of requirements models based on the requirements traceability information of FIG. 10. For example, in FIG. 3D, four requirements models (1010) are allocated to component2 based on the information in FIG. 10. Similarly, block 1020 indicates the requirements traceability information for component1; block 1030 indicates the requirements traceability information for component3; and block 1040 indicates the requirements traceability information for component4. The software architecture model depicted in FIGS. 3A-3D is then used to generate requirements-based test cases at different levels in the software architecture.

A user can select "component2" block (FIG. 4, step 410) to generate test cases at this unit-level and select input masking test strategy. In accordance with embodiments, test objectives and constraints blocks will automatically be attached to all the requirements models inside "component2" block at step 415. After calling Simulink Design Verifier at step 420 and translating test cases at step 425, the test cases that satisfy all the test objectives and constraints for input masking test strategy will be generated.

Figure 11:
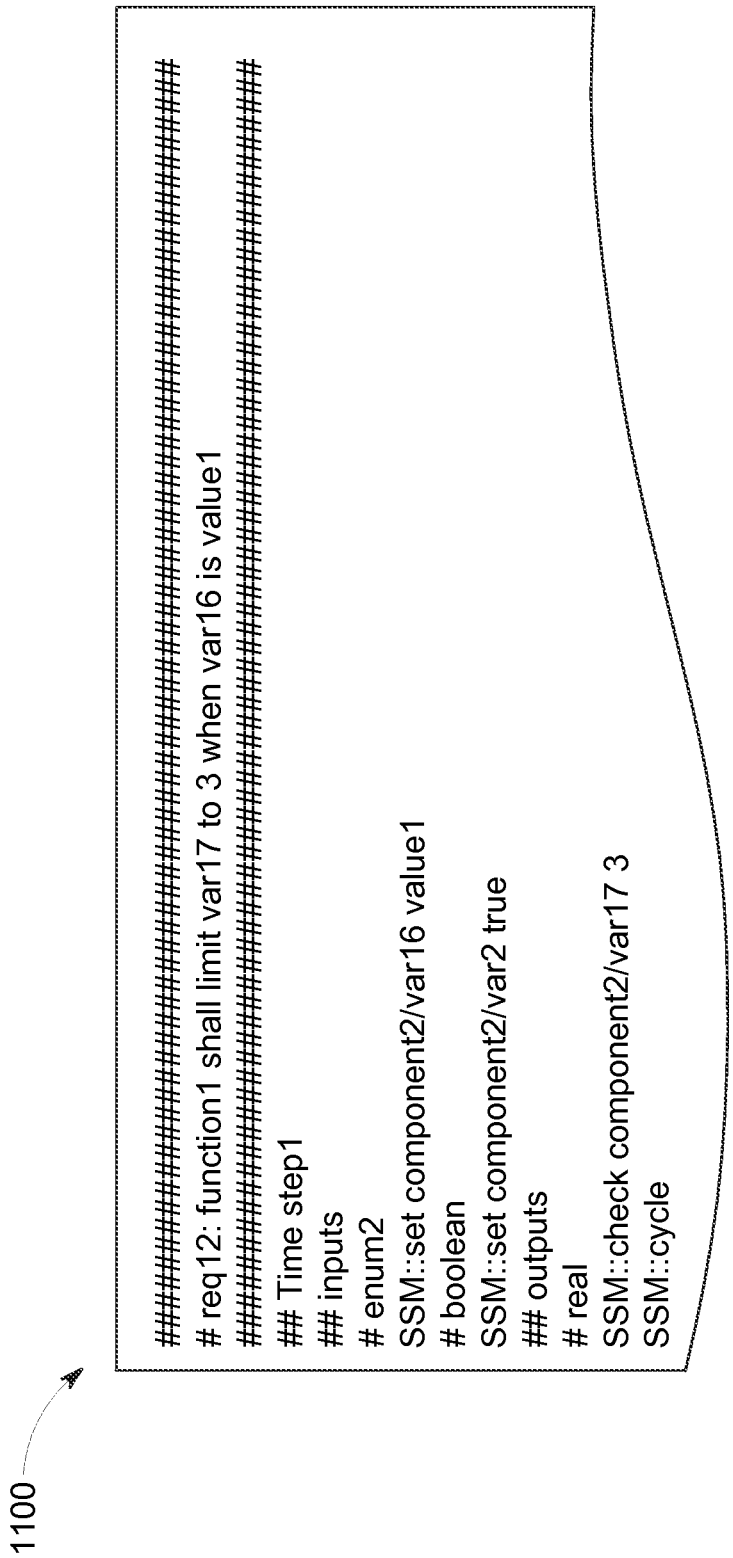
FIG. 11 depicts an exemplary unit level test script in accordance with embodiments.

FIG. 11 depicts exemplary unit level test script 1100 in accordance with embodiments. This unit level test script is an example of generated test cases at the unit-level for "component2." The test case is generated to be able to execute in SCADE test environment on the "component2" block in the design. A user can alternatively select integration-level block that includes component 1-4 at FIG. 4, step 410 to generate integration-level test cases. In accordance with embodiments, test objectives and constraints blocks are automatically attached to all the requirements models inside the integration-level block at step 415. After calling Simulink Design Verifier at step 420 and translating test cases at step 425, the test cases that satisfy all the test objectives and constraints for input masking test strategy will be generated.

FIG. 12 depicts exemplary integration level test script 1200 in accordance with embodiments. This test script is one example for the generated integration level test cases. The test case is generated to be able to execute in SCADE test environment on the integration-level block in the design.

In accordance with embodiments, a hierarchical data flow diagram (i.e., software architecture model along with requirement models) is automatically created to capture requirements and design information. This hierarchical data flow diagram is used to generate requirements-based test cases at different levels in the software architecture. In accordance with embodiments, system design information is used to build the hierarchical data flow diagram, where requirements models are allocated inside modules of the hierarchical data flow diagram. The requirements allocations are based on the requirements-module traceability information from the design information. Test objectives and constraints can be attached to the software architecture model according to a user-selected test strategy. Automatic test case generation is based on the hierarchical data flow diagram to generate requirements-based test cases at different levels in the design architecture that satisfy the test objectives and constraints. The generated test cases can be directly executed on components at multi-levels in the design.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor to perform methods discussed herein such as for automated requirements-based test case generation, as described above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A non-transitory computer-readable medium having stored thereon instructions which when executed by a processor cause the processor to perform a method for automated requirements-based test case generation, the method comprising:
constructing a software architecture model, the software architecture model automatically derived from architectural information of a software design model;
allocating requirement models into different blocks/operators of a software architecture model; and
generating component level requirements-based test cases from the software architecture model, wherein the component level requirements-based test cases are generated according to at least one strategy selected from the list of a requirements coverage strategy, a logic condition coverage strategy, and an input masking strategy;
wherein the input masking strategy includes masking Modified Condition/Decision Coverage (MC/DC).

2. The non-transitory computer-readable medium of claim 1, including instructions to cause the processor to allocate the requirement models by connecting corresponding monitored or controlled variables with an input port or an output port of respective ones of the different modules.

3. The non-transitory computer-readable medium of claim 1, including instructions to cause the processor to generate integration level test cases, and apply the integration level test cases to verify if a code module complies with the allocated requirements.

4. The non-transitory computer-readable medium of claim 1, including instructions to cause the processor to:
receive the software architecture model in the form of a hierarchical data flow diagram derived from the software design along with the allocated requirement models, the hierarchical data flow diagram including one or more blocks/operators mapping to corresponding components in the software design;
select one of the software components from the software design for test case generation; and
build an intermediate test model based on the selected component by automatically attaching at least one test objectives and test constraints to the corresponding software architecture model block/operator.

5. The non-transitory computer-readable medium of claim 4, including instructions to cause the processor to:
generate requirements-based test cases by performing at least one of model-checking, constraint solving, and reachability resolution methods on the intermediate test model; and
translate the generated test cases into test scripts for test execution, and into test artifacts for review.

6. A system for automated requirements-based test case generation, the system comprising:
a model based development tool including a control processor configured to execute instructions, the control processor connected to a communication link; and
a component level test case generator unit to automatically generate test cases, wherein the control processor configured to execute instructions that cause the control processor to generate the test cases according to at least one strategy selected from the list of a requirements coverage strategy, a logic condition coverage strategy, and an input masking strategy;
wherein the input masking strategy includes masking Modified Condition/Decision Coverage (MC/DC).

7. The system of claim 6, including the control processor configured to execute instructions that cause the control processor to perform the steps of:
deriving software architecture model from software design
allocating requirement models into different blocks/operators of a software architecture model;
generating component level requirements-based test cases.

8. The system of claim 7, including the control processor configured to execute instructions that cause the control processor to generate integration level test cases, and apply the integration level test cases to verify if a code module complies with the software architecture model and the allocated requirement models.

9. The system of claim 7, including the control processor configured to execute instructions that cause the control processor to:
receiving the software architecture model in the form of a hierarchical data flow diagram derived from the software design along with the allocated requirement models, the hierarchical data flow diagram including one or more blocks/operators mapping to corresponding components in the software design;
selecting one of the software components from the software design for test case generation; and
building an intermediate test model based on the selected component by automatically attaching at least one test objectives and test constraints to the corresponding software architecture model block/operator.

* * * * *